United States Patent
Lewites et al.

(10) Patent No.: US 7,484,210 B2
(45) Date of Patent: Jan. 27, 2009

(54) APPARATUS AND METHOD FOR A GENERIC, EXTENSIBLE AND EFFICIENT DATA MANAGER FOR VIRTUAL PERIPHERAL COMPONENT INTERCONNECT DEVICES (VPCIDS)

(75) Inventors: Saul Lewites, Aloha, OR (US); Priya Rajagopal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 981 days.

(21) Appl. No.: 10/780,803

(22) Filed: Feb. 17, 2004

(65) Prior Publication Data

US 2005/0183082 A1  Aug. 18, 2005

(51) Int. Cl.
G06F 9/455 (2006.01)
G06F 3/00 (2006.01)
G06F 13/20 (2006.01)

(52) U.S. Cl. .............................. 718/1; 710/15; 710/313
(58) Field of Classification Search ................. 718/100, 718/1; 710/15, 17, 18, 19, 104, 313
See application file for complete search history.

(56) References Cited

U.S. PATENT DOCUMENTS

| | | | |
|---|---|---|---|
| 5,761,448 A * | 6/1998 | Adamson et al. ............ 710/104 |
| 6,519,645 B2 * | 2/2003 | Markos et al. ............... 709/228 |
| 6,629,157 B1 * | 9/2003 | Falardeau et al. ............. 710/10 |
| 6,658,521 B1 * | 12/2003 | Biran et al. .................. 710/315 |
| 7,036,122 B2 * | 4/2006 | Bennett et al. ................. 718/1 |
| 2002/0049869 A1 * | 4/2002 | Ohmura et al. ................. 710/5 |
| 2002/0143842 A1 * | 10/2002 | Cota-Robles et al. .......... 709/1 |
| 2003/0005207 A1 * | 1/2003 | Langendorf et al. ......... 710/306 |
| 2003/0023895 A1 * | 1/2003 | Sinha et al. ..................... 714/5 |
| 2003/0097509 A1 * | 5/2003 | Fry et al. ..................... 710/305 |
| 2003/0208462 A1 * | 11/2003 | Pocock et al. ................... 707/1 |
| 2004/0064602 A1 * | 4/2004 | George ........................ 710/22 |
| 2004/0199700 A1 * | 10/2004 | Clayton ....................... 710/305 |
| 2005/0034125 A1 * | 2/2005 | Guy et al. .................... 718/100 |
| 2005/0039180 A1 * | 2/2005 | Fultheim et al. ............... 718/1 |
| 2005/0132365 A1 * | 6/2005 | Madukkarumukumana et al. ............................. 718/1 |

OTHER PUBLICATIONS

Levinthal et al., "The silicon gaming OdysseySlot machine", 1997, IEEE, pp. 296-301.*

* cited by examiner

*Primary Examiner*—Meng-Ai An
*Assistant Examiner*—Caroline Arcos
(74) *Attorney, Agent, or Firm*—Molly A. McCall

(57) ABSTRACT

An apparatus and method for a generic, extensible and efficient data manager for virtual peripheral component interconnect devices (VPCIDs). The apparatus includes a data manager and a data repository, where the data manager utilizes the data repository to maintain information for at least one virtual machine (VM). The VM data structure contains elements to associate the VM with zero or more instances of multiple VPCIDs.

9 Claims, 7 Drawing Sheets

Figure 1:
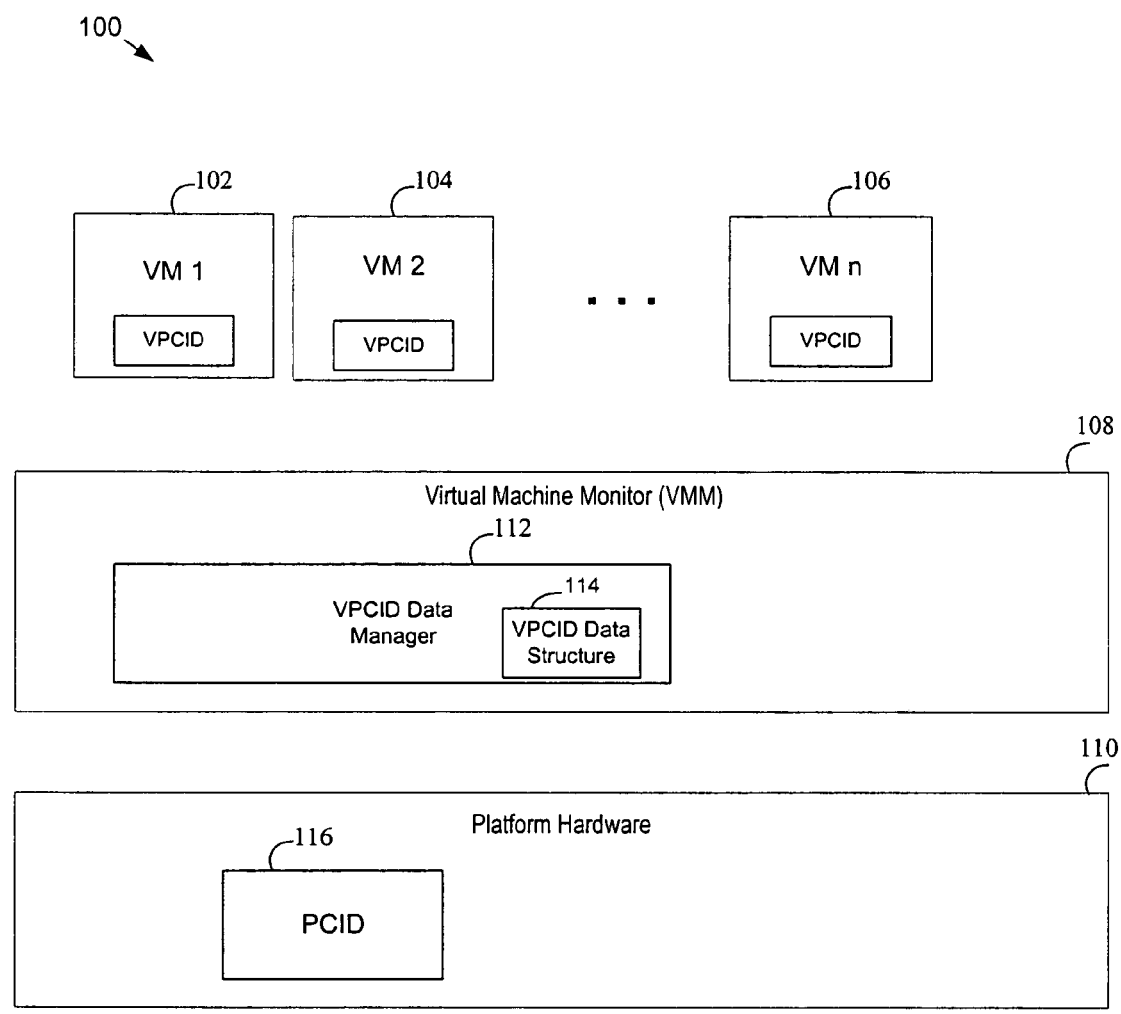

Flow chart for creating a VPCID instance

APPARATUS AND METHOD FOR A GENERIC, EXTENSIBLE AND EFFICIENT DATA MANAGER FOR VIRTUAL PERIPHERAL COMPONENT INTERCONNECT DEVICES (VPCIDS)

BACKGROUND

A single physical platform may be segregated into a plurality of virtual networks. Here, the physical platform incorporates at least one virtual machine monitor (VMM). A conventional VMM typically runs on a computer and presents to other software the abstraction of one or more virtual machines (VMs). Each VM may function as a self-contained platform, running its own "guest operating system" (i.e., an operating system (OS) hosted by the VMM) and other software, collectively referred to as guest software.

Processes running within a VM are provided with an abstraction of some hardware resources and may be unaware of other VMs within the system. Every VM assumes that it has full control over the hardware resources allocated to it. The VMM is an entity that is responsible for appropriately managing and arbitrating system resources among the VMs including, but not limited to, processors, input/out (I/O) devices and memory.

Peripheral component interconnect device (PCID) virtualization is a technique for providing an abstraction of a physical PCID(s) to the VMs. Through virtualization, the same physical PCID(s) can be shared by multiple VMs. In addition, PCID virtualization allows a VM to be presented with multiple instances of the same physical PCID. For example, a system may have a single physical PCID, but a VM may see multiple virtual PCIDs (VPCIDs), each of which interfaces with different components inside the physical platform and/or the external network to which the physical PCID is attached. The VPCID that is presented to a VM may be completely different than the actual physical PCID, thereby making it possible to expose features to the VM that may not exist in the actual physical hardware.

Virtualization of PCIDs involves the abstraction of a register set and the PCI configuration space of these devices. Virtualization of PCIDs requires efficient storage and tracking of the state and data information for each VPCID instance.

BRIEF DESCRIPTION OF THE DRAWINGS

The invention may be best understood by referring to the following description and accompanying drawings that are used to illustrate embodiments of the invention. In the drawings:

FIG. 1 illustrates one embodiment of a virtual machine environment, in which some embodiments of the generic, extensible and efficient virtual peripheral component interconnect device (VPCID) data manager of the present invention may operate;

FIG. 2 illustrates a VPCID data structure according to one embodiment of the present invention;

FIG. 3 is a flow diagram of one embodiment of a process for creating a VPCID instance;

FIG. 4 is a flow diagram of one embodiment of a process for allocating the VPCID data structure;

FIG. 5 is a flow diagram of one embodiment of a process for adding access ranges to either an I/O hash table or a memory hash table;

FIG. 6 is a flow diagram of one embodiment of a process for inserting data blobs associated with a VPCID instance; and FIG. 7 is a flow diagram of one embodiment of a process for accessing a data blob associated with a VPCID.

DESCRIPTION OF EMBODIMENTS

An apparatus and method for a generic, extensible and efficient data manager for virtual peripheral component interconnect devices (VPCIDs) are described. The VPCID data manager of the present invention maintains data and state information of VPCID instances. The framework of the data structure utilized by the VPCID data manager has the advantages of being efficient, extensible and generic, and therefore can be used for the virtualization of any type of PCI device. The VPCID data manager allows a VPCID to replicate itself and thus support multiple instances of itself across multiple VMs. In the following description, for purposes of explanation, numerous specific details are set forth. It will be apparent, however, to one skilled in the art that embodiments of the invention can be practiced without these specific details.

Embodiments of the present invention may be implemented in software, firmware, hardware, or by any combination of various techniques. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and hardware components.

Thus, a machine-readable medium may include any mechanism for storing or transmitting information in a form readable by a machine (e.g., a computer). These mechanisms include, but are not limited to, floppy diskettes, optical disks, Compact Disc Read-Only Memory (CD-ROMs), magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, and flash memory. Other types of mechanisms may be added or substituted for those described as new types of mechanisms are developed and according to the particular application for the invention.

Some portions of the detailed descriptions that follow are presented in terms of algorithms and symbolic representations of operations on data bits within a computer system's registers or memory. These algorithmic descriptions and representations are the means used by those skilled in the data processing arts to convey the substance of their work to others skilled in the art most effectively. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that discussions utilizing terms such as "processing" or "computing" or "calculating" or "determining" or the like, may refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

FIG. 1 illustrates one embodiment of an environment for the VPCID data manager, in which some embodiments of the present invention may operate. The specific components shown in FIG. 1 represent one example of a configuration that may be suitable for the invention and is not meant to limit the invention.

Referring to FIG. 1, an environment 100 for the VPCID data manager includes, but is not necessarily limited to, one or more VMs 102 through 106, a VMM 108 and platform hardware 110. Though three VMs are shown in FIG. 1, it is understood that any number of VMs may be present in environment 100. Each of these components is described next in more detail.

VMs 102 through 106 each include one or more VPCIDs. In an embodiment of the invention, each VM in FIG. 1 has a unique ID. VMM 108 includes a VPCID data manager 112. VPCID data manager 112 includes a VPCID data structure 114. VPDIC data manager 112 uses VPCID data structure 114 to maintain data and state information of VPCID instances in environment 100. In an embodiment of the invention, VPCID data manager 112 is agnostic of the virtualization model used by VMM 108 (e.g., hypervisor, host-based, hybrid, and so forth). Other types of virtualization models may be added or substituted for those described as new types of virtualization models are developed and according to the particular application for the invention. Finally, platform hardware 110 includes a physical PCID 116.

In general, PCID virtualization is a technique for providing an abstraction of a physical PCID(s), such as PCID 116, to the VMs, such as VM 102 through 106. Through virtualization, the same physical PCID(s) can be shared by multiple VMs. In addition, PCID virtualization allows a VM to be presented with multiple instances of the same physical PCID. For example, a system may have a single physical PCID, but a VM may see multiple virtual PCIDs (VPCIDs), each of which interfaces with different components inside the physical platform and/or the external network to which the physical PCID is attached. The VPCID that is presented to a VM may be completely different than the actual physical PCID, thereby making it possible to expose features to the VM that may not exist in the actual physical hardware.

As described above, platform hardware 110 includes physical PCID 116. Although only one PCID is shown in FIG. 1, it is understood that any number of PCIDs may be present in environment 100. Platform hardware 110 can be of a personal computer (PC), mainframe, handheld device, portable computer, set-top box, or any other computing system. Platform hardware 110 may include one or more processors and memory (not shown in FIG. 1). Additionally, platform hardware 110 may include memory and a variety of other input/output devices (also not shown in FIG. 1).

The processors in platform hardware 110 can be any type of processor capable of executing software, such as hyperthreaded, SMP, multi-core, microprocessor, digital signal processor, microcontroller, or the like, or any combination thereof. Other types of processors may be added or substituted for those described as new types of processors are developed and according to the particular application for environment 100. The processors may include, but are not necessarily limited to, microcode, macrocode, software, programmable logic, hard coded logic, etc., for performing the execution of embodiments for methods of the present invention.

The memory of platform hardware 110 can be any type of recordable/non-recordable media (e.g., random access memory (RAM), read only memory (ROM), magnetic disk storage media, optical storage media, flash memory devices, etc.), as well as electrical, optical, acoustical or other form of propagated signals (e.g., carrier waves, infrared signals, digital signals, etc.), any combination of the above devices, or any other type of machine medium readable by the processors. Other types of recordable/non-recordable media may be added or substituted for those described as new types of recordable/non-recordable are developed and according to the particular application for the invention. Memory may store instructions for performing the execution of method embodiments of the present invention.

In environment 100, the platform hardware 110 comprises a computing platform, which may be capable, for example, of executing a standard operating system (OS) or a virtual machine monitor (VMM), such as a VMM 108. VMM 108, though typically implemented in software, may emulate and export a bare machine interface to higher level software. Such higher level software may comprise a standard or real-time OS, may be a highly stripped down operating environment with limited operating system functionality, or may not include traditional OS facilities. Alternatively, for example, VMM 108 may be run within, or on top of, another VMM. VMMs and their typical features and functionality are well known by those skilled in the art and may be implemented, for example, in software, firmware, hardware or by a combination of various techniques.

In an embodiment of the invention, each VPCID in VM 102 through 106 owns regions in at least two of three virtual address spaces (not shown in FIG. 1). These regions include the virtual PCI configuration space and at least one of the two following regions: the virtual I/O space and the virtual memory space. The region in virtual PCI configuration space is where the PCID configuration registers reside, which include identification registers such as the device ID and vendor ID, I/O base address registers and memory base address registers. The regions in virtual I/O space and virtual memory space include the command and status registers (CSRs), the receive and transmit DMA configuration registers, statistics registers and other device configuration registers. The I/O and memory base address registers represent the base address of the IO/memory-mapped region for hosting the device's CSRs.

PCID virtualization allows a VM to be presented with multiple instances of the same physical PCID. A VPCID instance can be uniquely identified by the unique ID of the VM that hosts the VPCID, the type of address space access (configuration, I/O or memory) and the actual address accessed within that space. Every VPCID instance needs associated state blobs that contain state and data information. State blobs include, but are not necessarily limited to, an Electrically Erasable Programmable Read-Only Memory (EEPROM) map and direct memory access (DMA) engine states. Since the data and state information for each VPCID instance are accessed frequently, the mechanism for storing and retrieving them must be efficient. Frequent memory accesses can be cached. An example of this includes the polling of status registers. VPCID data manger 112 utilizes VPCID data structure 114 to accomplish the foregoing. VPCID data structure 114 is further described next with reference to FIG. 2.

Figure 2:
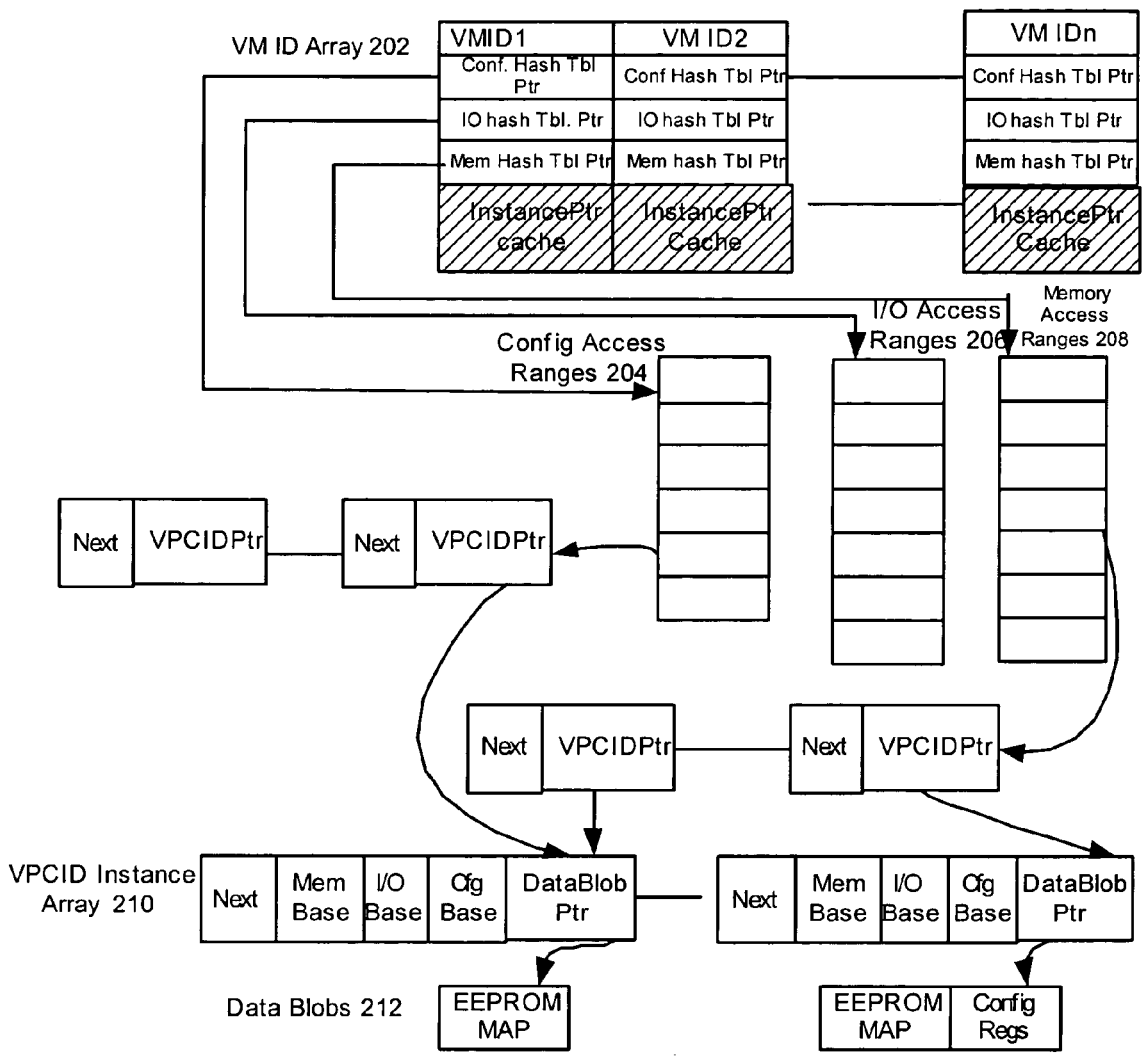

Referring to FIG. 2, the framework of VPCID data structure 114 has the advantages of being efficient, extensible and generic, and therefore can be used for the virtualization of any type of PCI device. The root structure of VPCID data structure 114 is a VM ID array 202. In an embodiment of the invention, each VM has a unique ID. Each unique VM ID serves as an index into the elements of VM ID array 202. Each element of VM ID array 202 represents a unique VM. Associated with every VM element in array 202 is a set of VPCID instances and a cache of VPCID instance pointers.

The instance pointer cache of each element of VM ID array 202 represents the list of recently accessed addresses and associated VPCID instance pointers. Thus, for frequently accessed addresses, this cache allows immediate retrieval of the associated VPCID instance structure. Each element of VM ID array 202 also has three hash tables pointers associated with it, including a configuration hash table pointer, an I/O hash table pointer and a memory hash table pointer. The configuration hash table pointer points to configuration access ranges 204, the I/O hash table pointer points to I/O access ranges 206 and the memory hash table pointer points to memory access ranges 208. Entries in each of configuration access ranges 204, I/O access ranges 206 and memory access ranges 208 point to the VPCID instances in a VPCID instance array 210 that own the address access ranges.

VPCID instance array 210 is an array of VPCID instances. Each VPCID instance in VPCID instance array 210 includes, but is not necessarily limited to, the following elements: a memory base, an I/O base, a configuration base and a data blob pointer. As described above, a VPCID instance can be uniquely identified by the unique ID of the VM that hosts the VPCID, the type of address space access (configuration, I/O, or memory) and the actual address accessed within that space. The memory base, I/O base, and configuration base addresses are used for validating/determining if the actual address being accessed is within the appropriate address range. Every VPCID instance in VPCID instance array 210 has an associated array of data blobs 212.

Data blobs 212 store VPCID specific state and data information for its associated VPCID instance. Data blobs 212 include, but are not necessarily limited to, the following elements: an Electrically Erasable Programmable Read-Only Memory (EEPROM) map and configuration registers. The EEPROM map represents the device EEPROM that is used to hold various product specific configuration information. This is used to provide pre-boot configuration. The configuration registers include registers which are used for configuring VPCID features including receive and transmit DMA engines, power management parameters, VLAN configuration etc. Data blobs 212 may be implemented as an array, linked list, hash table, or a different data structure depending on the application. Embodiments of the operation of how VPCID data manager 112 utilizes VPCID data structure 114 to provide a generic, extensible and efficient data manager for VPCID instances are described next with reference to FIGS. 3-7.

Figure 3:
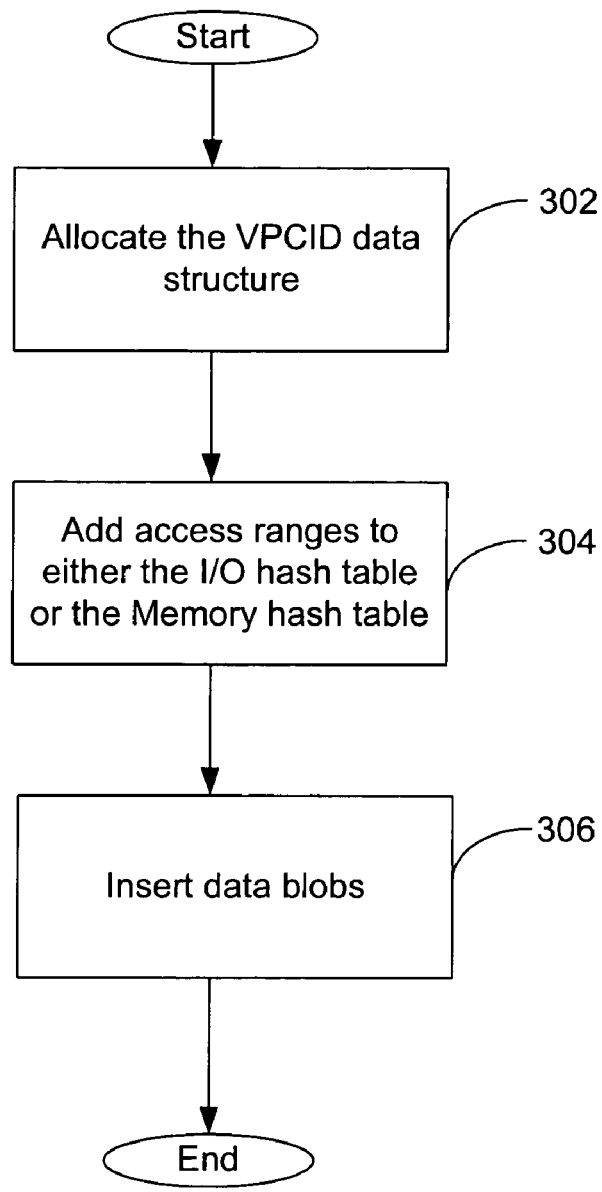

FIG. 3 is a flow diagram of one embodiment of a process for creating a VPCID instance. Referring to FIG. 3, the process begins at processing block 302 where VPCID data structure 114 is allocated for the VPCID instance. Processing block 302 is described in more detail below with reference to FIG. 4.

At processing block 304, access ranges are added for the VPCID instance to either the I/O hash table (i.e., I/O access ranges 206) or the memory hash table (i.e., memory access ranges 208). As described above, each VPCID owns regions in the virtual PCID configuration space and in at least one of the virtual I/O space and the virtual memory space. Processing block 304 is described in more detail below with reference to FIG. 5.

At processing block 306, data blobs 212 are inserted for the VPCID instance. Processing block 306 is described in more detail below with reference to FIG. 6. The process of FIG. 3 ends at this point.

Figure 4:
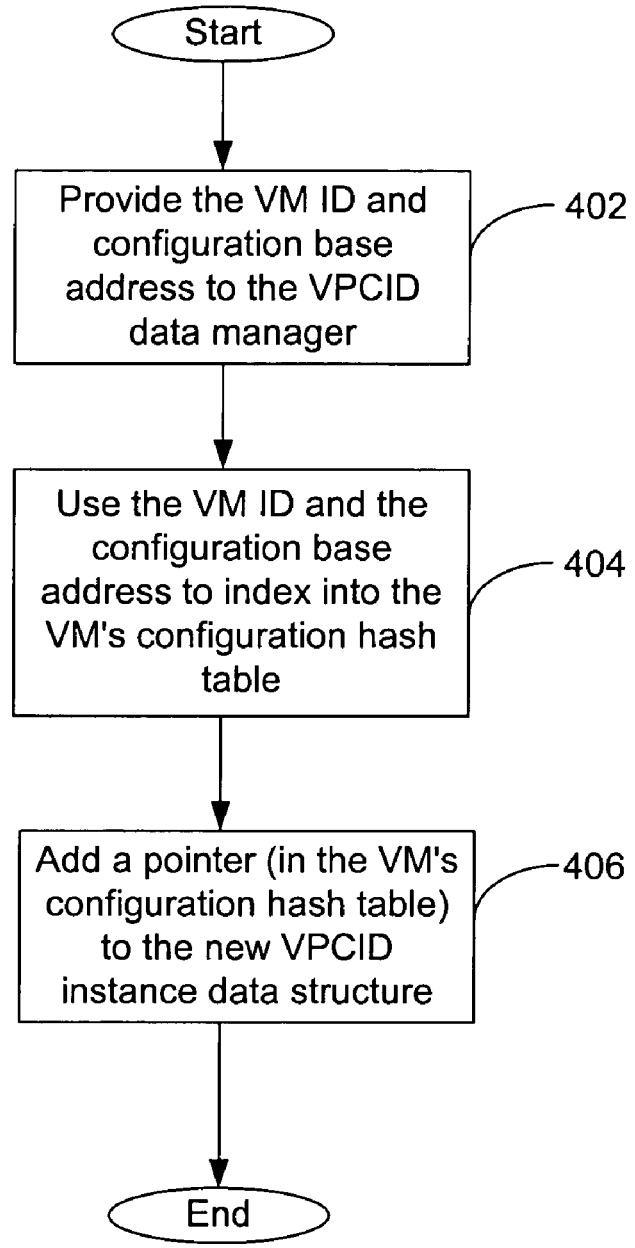

FIG. 4 is a flow diagram of one embodiment of a process for allocating VPCID data structure 114 (step 302 of FIG. 3). Referring to FIG. 4, the process begins at processing block 402 where the unique VM ID and the configuration base address of the VPCID instance is provided to VPCID data manager 112.

At processing block 404, VPCID data manager 112 uses the unique VM ID and the configuration base address to index into VM ID array 202 and ultimately into the VM's configuration hash table or configuration access ranges 204 (via configuration hash table pointer).

At processing block 406, VPCID data manager 112 adds a pointer in the VM's configuration hash table (i.e., configuration access ranges 204) to the new VPCID instance array 210. The process of FIG. 4 ends at this point.

Figure 5:
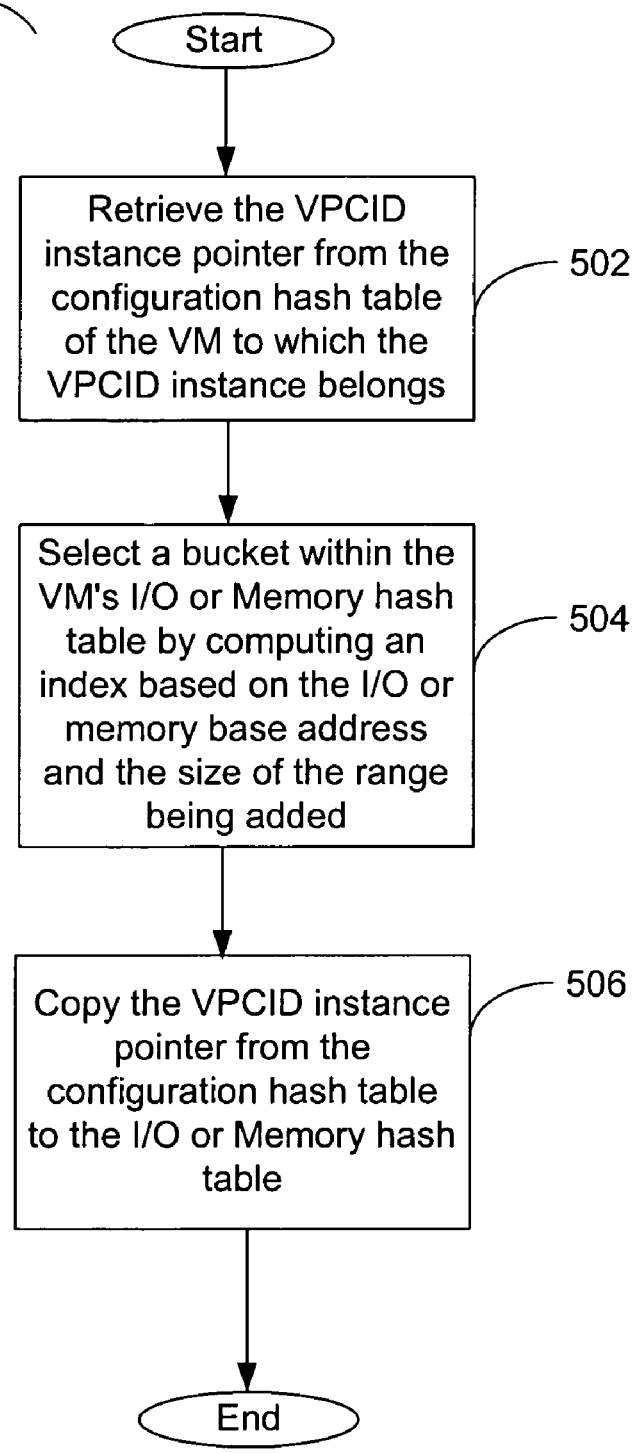

FIG. 5 is a flow diagram of one embodiment of a process for adding access ranges to either an I/O hash table or a memory hash table (step 304 of FIG. 3). Referring to FIG. 5, the process begins at processing block 502 where VPCID data manager 112 retrieves the VPCID instance pointer from the configuration hash table (i.e., configuration access ranges 204) of the VM to which the VPCID instance belongs. In an embodiment of the invention, this operation takes between O(1) and O(n) (where n is the total number of VPCID instances) depending on the quality of the hash function H. Note that O(n) is the worst case running time for the invention and therefore is not an average run time for the invention. A good hash function can distribute the VPCID instances evenly across the hash table so that every bucket holds one or very few VPCID instance pointers. Note that a cache lookup (via instance pointer cache in VM ID array 202) is done first to locate the VPCID instance pointer corresponding to the address.

At processing block 504, VPCID data manager 112 selects a bucket within the VM's I/O or memory hash table (i.e., I/O access ranges 206 or memory access ranges 208, respectively) by computing an index based on the I/O or memory base address and the size of the range being added.

At processing block 506, VPCID data manager 112 copies the VPCID instance pointer from the configuration hash table to the I/O or memory hash table. From this point on, the VPCID instance pointer is quickly retrieved whenever the device driver in the VM accesses an address within the range. The process of FIG. 5 ends at this point.

Figure 6:
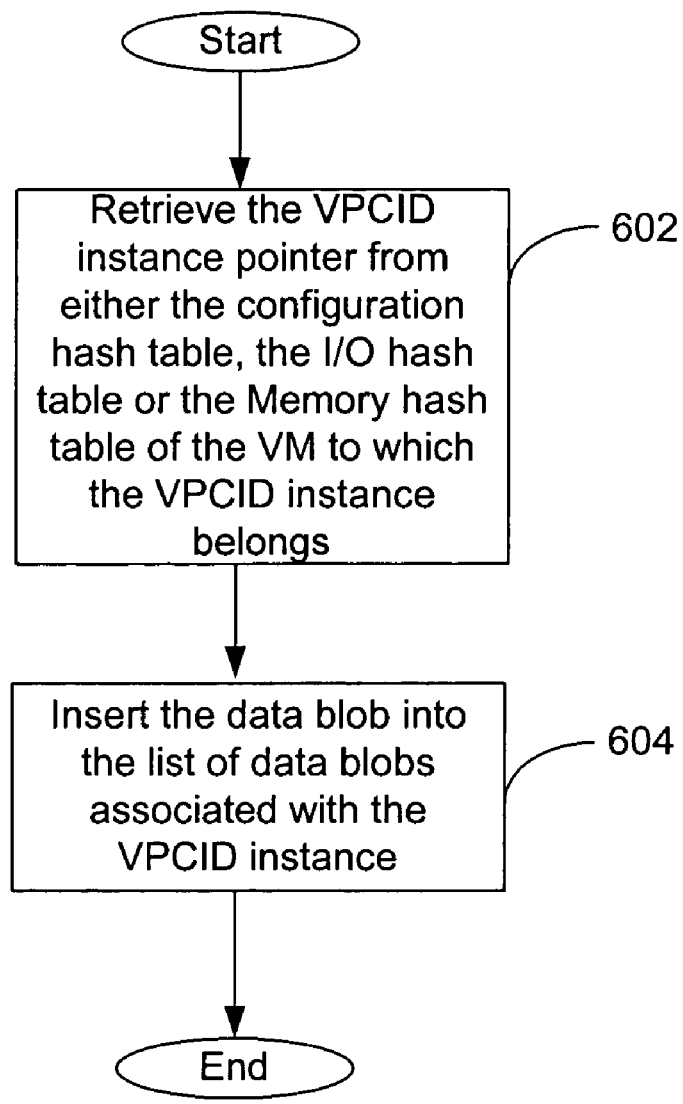

FIG. 6 is a flow diagram of one embodiment of a process for inserting data blobs associated to the VPCID instance (step 306 of FIG. 3). Referring to FIG. 6, the process begins at processing block 602 where VPCID data manager 112 retrieves the VPCID instance pointer from either the configuration hash table, the I/O hash table or the memory hash table of the VM to which the VPCID instance belongs. Note that computing a hash index is only needed if the instance pointer is not already stored in the instance pointer cache.

At processing block 604, VPCID data manager 112 inserts the data blob into the list of data blobs associated with the VPCID instance. The process of FIG. 5 ends at this point.

Figure 7:
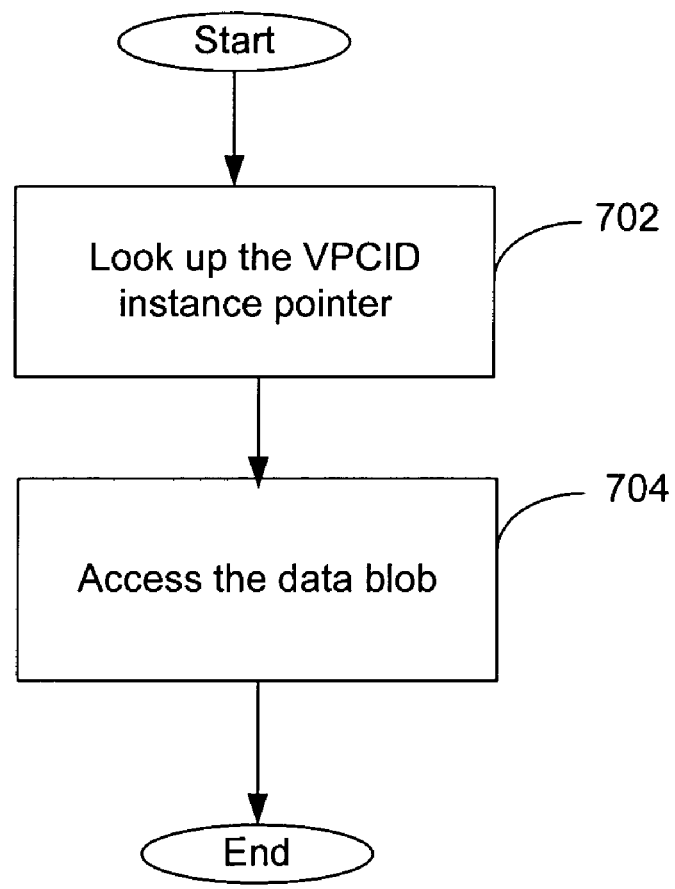

FIG. 7 is a flow diagram of one embodiment of a process for accessing a data blob associated with a VPCID. Referring to FIG. 7, the process begins at processing block 702 where VPCID data manager 112 looks up the VPCID instance pointer in VPCID instance array 210.

At processing block 704, VPCID data manager 112 accesses data blob 212 via the VPCID instance pointer. Note also that once the VPCID instance pointer is retrieved, accessing a data blob is an O(1) lookup operation since it simply involves accessing data blob 212 with the specified index value. The process of FIG. 7 ends at this point.

An apparatus and method for a generic, extensible and efficient data manager for VPCIDs have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system, comprising:
   a peripheral component interconnect device (PCID);
   a processor;
   a memory coupled to the processor; and
   a data structure stored in the memory, wherein the processor utilizes the data structure to maintain information for at least one virtual peripheral component interconnect device (VPCID), wherein the at least one VPCID is a virtualization of the PCID, and wherein the data structure includes a root structure of a virtual machine (VM) ID array, wherein each element of the VM ID array represents an unique VM, wherein each element of the VM ID array has an associated set of VPCID instances, wherein each VPCID instance in the VMID array has an associated array of data blobs, wherein each array of data blobs stores state and data information for its associated VPCID instance, wherein each array of data blobs includes at least one configuration register, and where the at least one configuration register is used for configuring VPCID features.

2. The system of claim 1, wherein the information includes both data and state information.

3. The system of claim 1, wherein the processor utilizes the data structure to maintain information for at least one instance of the at least one VPCID.

4. A computer-implemented method, comprising:
   maintaining information for at least one virtual peripheral component interconnect device (VPCID) via a data manager and a data structure, wherein the data structure includes a root structure of a virtual machine (VM) ID array, wherein each element of the VM ID array represents an unique VM, wherein each element of the VM ID array has an associated set of VPCID instances, wherein each VPCID instance in the VMID array has an associated array of data blobs, wherein each array of data blobs stores state and data information for its associated VPCID instance, wherein each array of data blobs includes at least one configuration register, and where the at least one configuration register is used for configuring VPCID features.

5. The computer-implemented method of claim 4, wherein the information includes both data and state information.

6. The computer-implemented method of claim 4, further comprising utilizing the data structure by the data manager to maintain information for at least one instance of the at least one VPCID.

7. A tangible machine-readable storage medium containing instructions which, when executed by a processing system, cause the processing system to perform a method, the method comprising:
   maintaining information for at least one virtual peripheral component interconnect device (VPCID) via a data manager and a data structure, wherein the data structure includes a root structure of a virtual machine (VM) ID array, wherein each element of the VM ID array represents an unique VM, wherein each element of the VM ID array has an associated set of VPCID instances, wherein each VPCID instance in the VMID array has an associated array of data blobs, wherein each array of data blobs stores state and data information for its associated VPCID instance, wherein each array of data blobs includes at least one configuration register, and where the at least one configuration register is used for configuring VPCID features.

8. The tangible machine-readable storage medium of claim 7, wherein the information includes both data and state information.

9. The tangible machine-readable storage medium of claim 7, further comprising utilizing the data structure by the data manager to maintain information for at least one instance of the at least one VPCID.

* * * * *